United States Patent [19]
Oslund

[11] Patent Number: 5,618,428
[45] Date of Patent: Apr. 8, 1997

[54] FILTRATION SYSTEM FOR AQUARIUMS

[76] Inventor: Arthur D. Oslund, 302 Stanmore Rd., Baltimore, Md. 21212

[21] Appl. No.: 592,842

[22] Filed: Jan. 22, 1996

[51] Int. Cl.$^6$ .......................... A01K 63/00; A01K 63/04
[52] U.S. Cl. .................. 210/602; 210/617; 210/631; 210/169; 210/282; 210/416.2; 119/246; 47/69
[58] Field of Search ...................... 119/246, 247, 119/259, 260; 210/602, 615, 616, 617, 618, 622, 629, 631, 694, 169, 196, 264, 282, 416.2; 47/69 T

[56] References Cited

U.S. PATENT DOCUMENTS

| | | | |
|---|---|---|---|
| 2,306,027 | 12/1942 | Swaney | 119/246 |
| 4,117,805 | 10/1978 | Ward | 119/246 |
| 4,169,050 | 9/1979 | Serfling et al. | 210/12 |
| 4,713,173 | 12/1987 | Goldman et al. | 210/169 |
| 4,754,571 | 7/1988 | Riechmann | 47/59 |
| 5,040,489 | 8/1991 | Drake | 119/246 |
| 5,046,451 | 9/1991 | Inslee et al. | 119/3 |
| 5,121,708 | 6/1992 | Nuttle | 119/3 |
| 5,127,366 | 7/1992 | Kim | 119/246 |
| 5,269,094 | 12/1993 | Wolverton et al. | 210/602 |
| 5,290,436 | 3/1994 | Danner | 210/169 |

OTHER PUBLICATIONS

Brochure on "Second Nature Whisper Power Filter", Wilinger Bros., Inc., Wright Way, Oakland, NJ 07436–3121, 1993.

Primary Examiner—Peter A. Hruskoci
Assistant Examiner—Theodore M. Green
Attorney, Agent, or Firm—Leonard Bloom

[57] ABSTRACT

A filtration system for an aquarium having water and fish. A container is mounted in juxtaposition to the aquarium and a porous filter is disposed in the container. The top of the filter is connected to the bottom of a pot in which is growing a terrestrial plant in soil. A pump circulates water from the aquarium into the container and through the filter. The filter removes solid and dissolved pollutants from the water and roots of the plant grow into the filter, utilizing the pollutants retained in the filter.

10 Claims, 6 Drawing Sheets

FILTRATION SYSTEM FOR AQUARIUMS

CROSS REFERENCE TO RELATED APPLICATIONS (Not applicable.)

STATEMENT REGARDING FEDERALLY SPONSORED RESEARCH OR DEVELOPMENT (Not applicable.)

REFERENCE TO A MICROFICHE APPENDIX SPECIFYING THE TOTAL NUMBER OF MICROFICHE AND TOTAL NUMBER OF FRAMES (Not applicable.)

BACKGROUND OF THE INVENTION

The present invention relates to a filtration system for aquariums and more particularly to a filtration system in which the roots of a terrestrial plant grow into the filtration means and utilize the waste products from the aquarium carried by the water.

Filtration is an important consideration in an aquarium which serves the following functions:

- To remove unwanted gross solid particulate matter such as uneaten food and feces (mulm) from the water so as to keep it clear.
- To remove unwanted coloring matter, which gradually accumulates in the water, turning it yellow and then brown if it is not frequently changed.
- Occasionally to remove algal or bacterial "blooms", which cloud the water and make it opaque, green, or milky in appearance. Algae utilize oxygen and severe algal contamination depletes the supply of oxygen and can result in oxygen starvation of the fish. In addition, some algae produce toxins which are poisonous to the fish.
- To remove invisible, colorless dissolved matter such as ammonia and nitrites that are poisonous to the fish in all but minute amounts.

An ordinary coarse filter material such as synthetic filter floss or filter pads of various types only copes with the first item above when it is first set up or if the filter is frequently cleaned out, but as time goes on an old filter bed may start performing some of the other functions as well, particularly removal of dissolved matter. This is because bacteria grow in it that convert unwanted products of fish life, such as those listed, to harmless ones—particularly nitrates—which are utilized by the plants.

The main toxic material produced by the breakdown of excreta, uneaten food, etc., is ammonia. This is converted to nitrites by bacteria such as Nitrosomonas, then by further bacterial action, involving Nitrobacter, the nitrites are converted to nitrates. Both ammonia and nitrites are harmful to fish, even in minute amounts (200 to 300 parts per million), and can be monitored by suitable test kits. However, if bacteria growth is not present, the decomposition of uneaten food and mulm produces toxic substances which may kill the fish.

Another popular filter material, activated carbon or charcoal, performs, in particular, removal of coloring matter and dissolved matter right from the start. Fine granulated so-called gas grade charcoal has an enormous adsorptive surface on which chemicals of all descriptions may be adsorbed, and on which bacteria may also grow. These bacteria may interfere with the charcoal's main function, although a balance often seems to be achieved, with quite old charcoal continuing to adsorb chemicals and grow bacteria. Eventually, it will clog up and have to be replaced, but it can take up to more than half its own weight of adsorbed materials with it. When in a semi-clogged condition, both filter wools and activated charcoal extract finer and finer materials and may assist in removal of algae. Most of the desirable functions of a simple filter will be performed if it is provided with a bed of fine filter floss and activated charcoal. The charcoal is usually placed between layers of floss, so that it cannot escape into the aquarium.

The simplest filter is a box filter which is disposed inside the aquarium and is generally placed in a back corner where it is less visible. The box is usually a transparent plastic container filled with a combination of filter wool and charcoal (sometimes with gravel). A layer of charcoal is sandwiched between the filter wool, with gravel on the bottom to weigh down the container.

Other filters may hang inside the top of the tank, or outside the top of the tank, and are then known as "inside" or "outside" filters. An airlift conveys water into the filter using a simple injection of air into a plastic tube. In an inside filter, the airlift curves over at the top, the air-water mixture flows into the filter and the water passes down through the filter bed and escapes back into the tank via perforations at the base of the filter. In an outside filter the water is drawn into a tube by an airlift in the tank and so returns to the tank, while one or more siphon tubes convey water from the tank to the filter, where it passes through the filter bed (or beds) and back into the tank. It is preferred that a pump be used with an outside filter to draw water up from the tank, pass the water through the filter and return the water to the tank.

U.S. Pat. No. 4,169,050 discloses a wastewater treatment for a pond which has floating aquatic plants, submerged bio-web substrates and aeration by submerged perforated air diffusers and a floating aerator.

A terrarium/aquarium combination is disclosed in U.S. Pat. No. 4,754,571. The plants in the terrarium are separated from the aquarium by a vertical partition. The combination provides an apparatus for humidifying indoor air. Included are filter plates beneath the terrarium substrate and in the aquarium.

A fish farm and hydroponic greenhouse are disclosed in U.S. Pat. No. 5,046,451. The fish tank is equipped with a submerged biofilter with vertical channels and underlying air lines. Air bubbles rise in the channels to agitate and aerate the water.

U.S. Pat. No. 5,121,708 discloses a hydro culture crop production system for raising land and aquatic plant and animal crops.

BRIEF SUMMARY OF THE INVENTION

It is an object of the present invention to provide a filtration system for an aquarium which removes the waste products from the fish, excess food for the fish and algae to maintain the aquarium in a clean condition.

It is a further object of the invention to provide a filtration system for an aquarium which enhances the natural beauty of the aquarium.

In accordance with the teachings of the present invention, there is disclosed a filtration system for an aquarium. The aquarium has water and fish therein and a pump means to recirculate the water. The system further includes a container having an open top mounted in juxtaposition to the aquarium. The pump means is in fluid communication with the container wherein the water is circulated between the container and the aquarium. Filtration means are contained in a porous cartridge which has a top. The cartridge is disposed in the container such that circulating water carrying waste products from the aquarium passes through the porous cartridge. A pot having a bottom with an opening therein is mounted in the open top of the container. The opening in the bottom of the container is in communication with the top of the porous cartridge. The pot further contains soil and a plant having roots growing therein. The roots of the plant grow into the cartridge and utilize the waste products carried by the water recirculated from the aquarium, such that the aquarium is maintained in a clean and substantially algae-free condition and the plant grows in the pot.

A method of filtering water in an aquarium is also disclosed.

These and other objects of the present invention will become apparent from a reading of the following specification, taken in conjunction with the enclosed drawings.

DESCRIPTION

Figure 1:
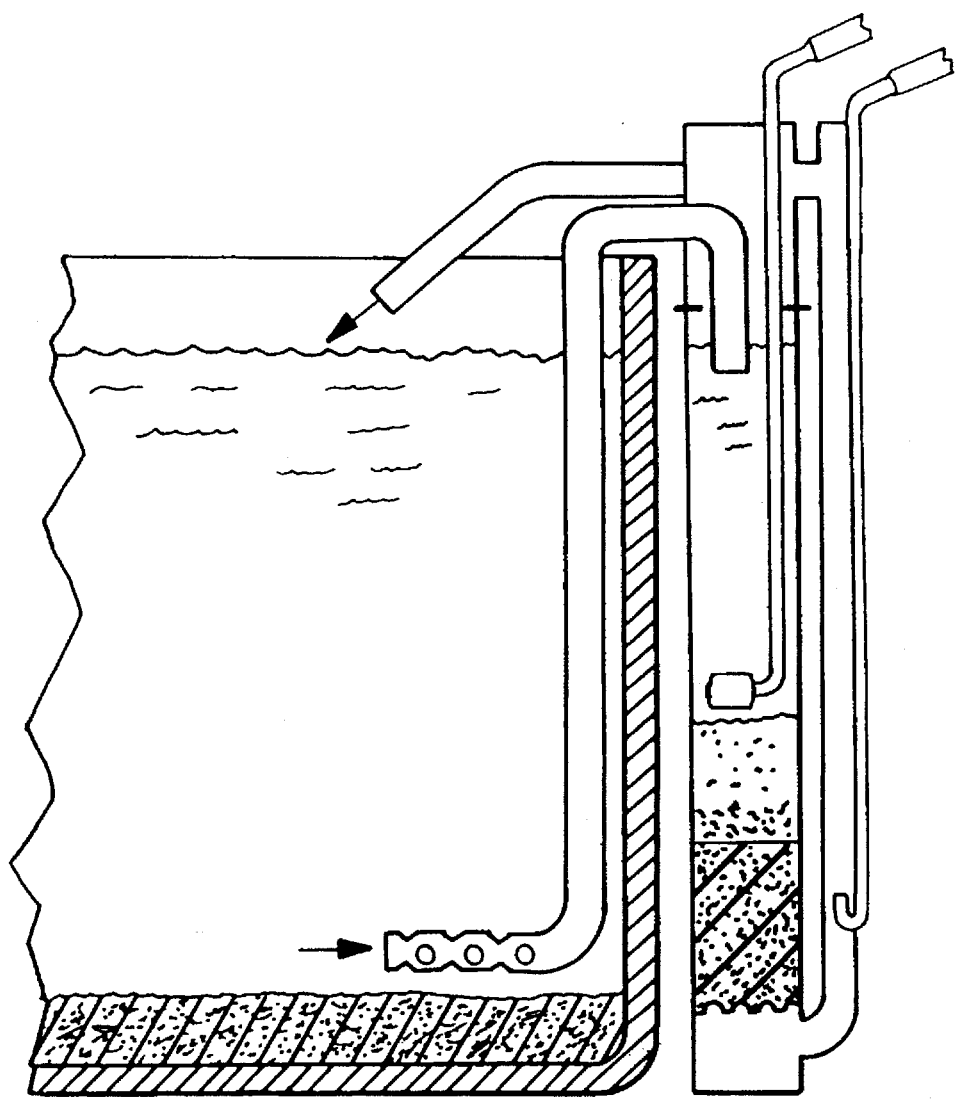
FIG. 1 is a cross-sectional view of a prior art filter on an aquarium.
Figure 2:
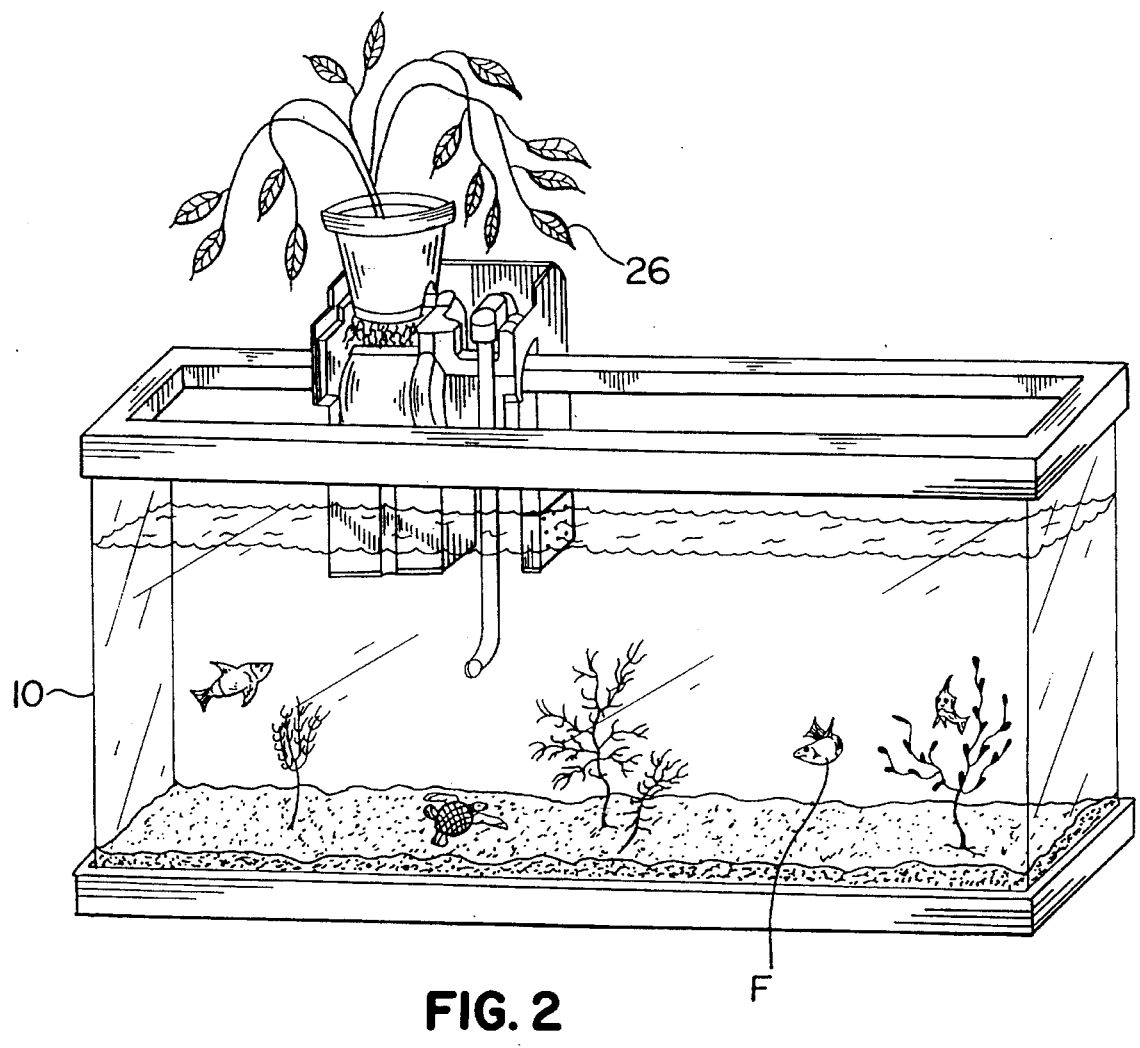
FIG. 2 is a perspective view of the filter system of the present invention used with an aquarium.
Figure 3:
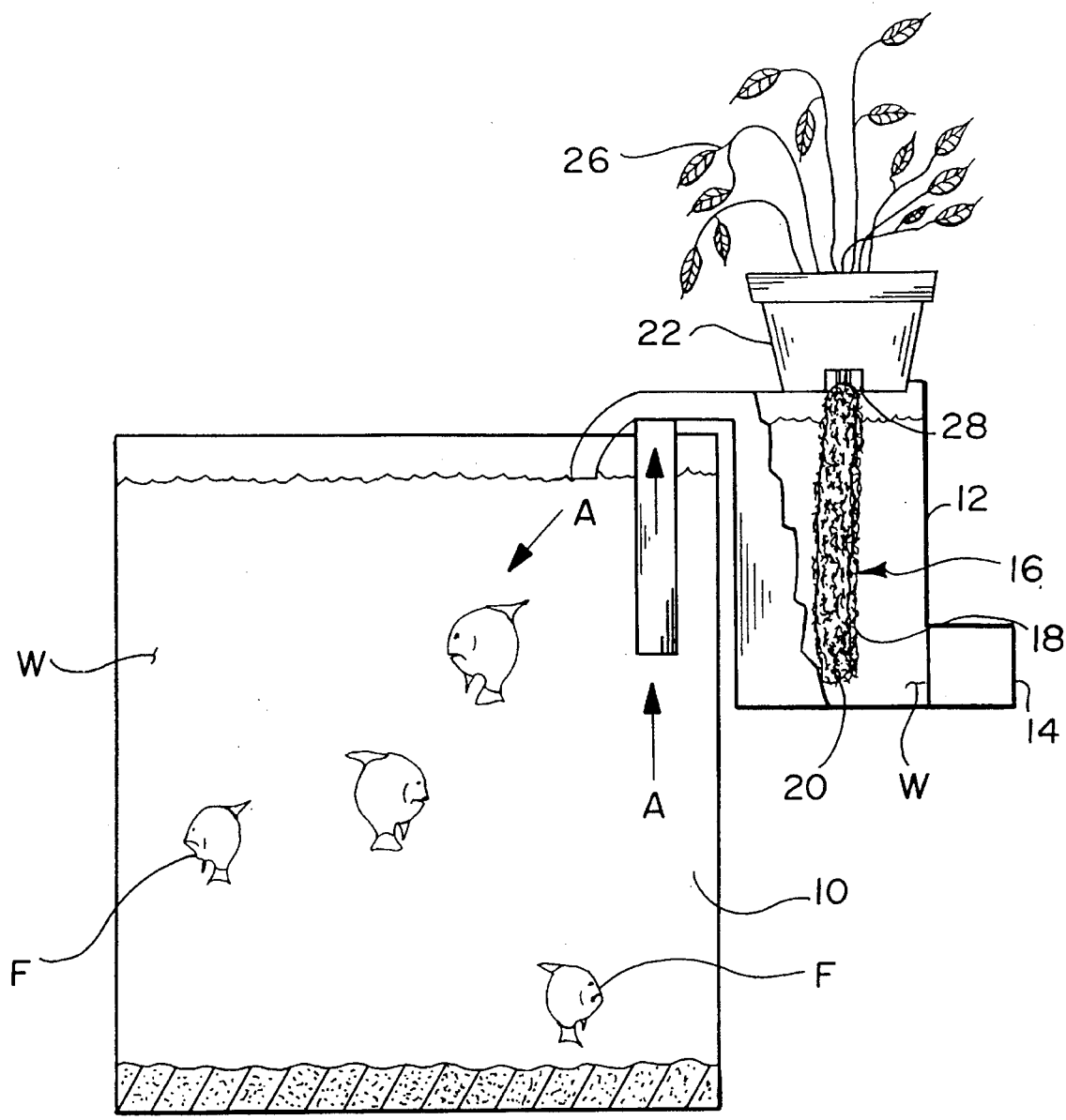
FIG. 3 is a side view of the filter system attached to the aquarium showing a partial cut-away of the container and the filtration means.
Figure 4:
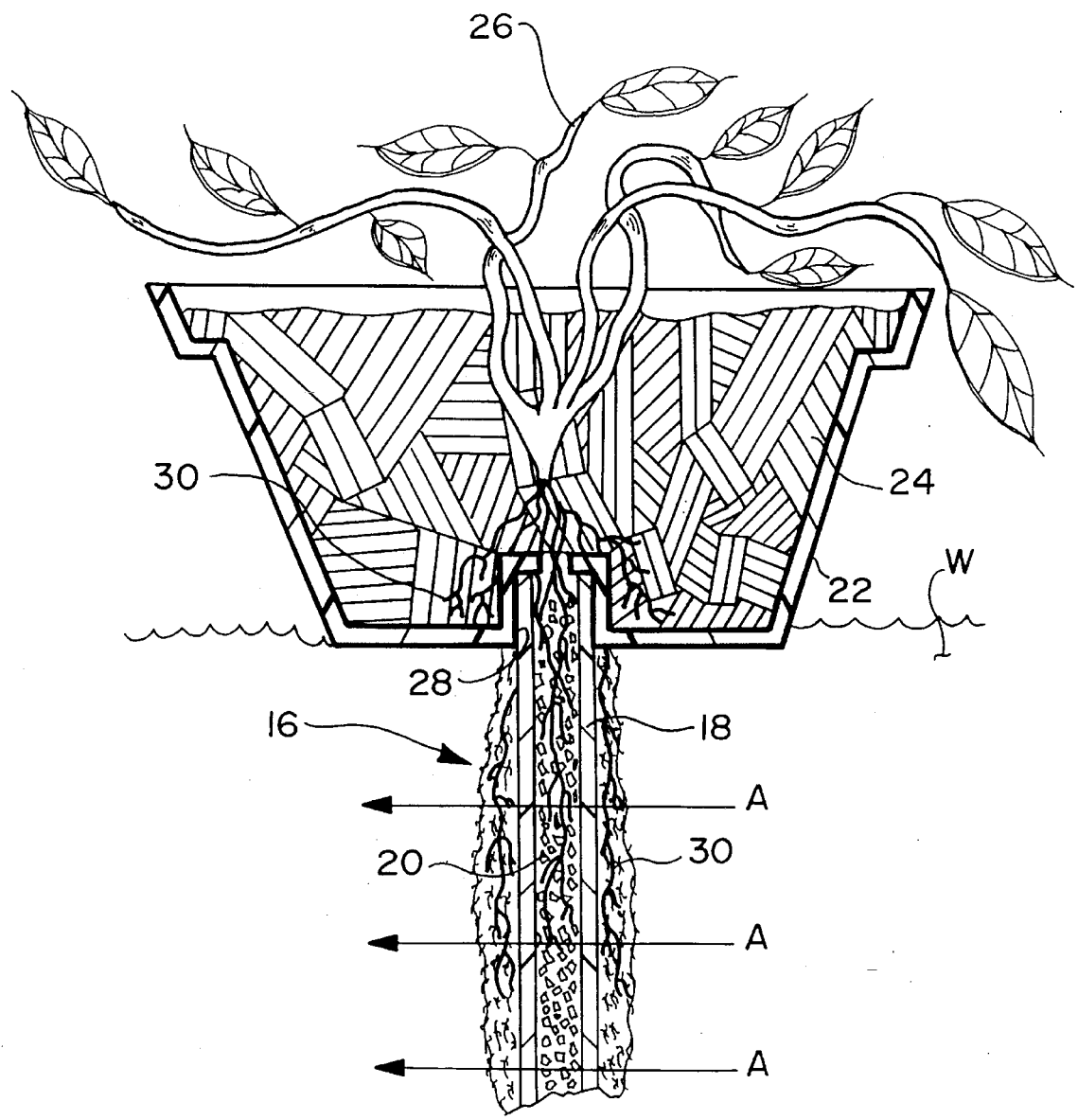
FIG. 4 is a cross-sectional view of the potted plant with the cartridge attached.

Referring now to FIGS. 1–4, an aquarium 10 has fish F and water W therein. The fish F produces solid waste products which contain some water soluble nitrogenous materials. When the fish are fed, there is usually an excess of fish food which remains in the water. These substances are conducive the growth of algae within the water. In order to remove these substances, to maintain the aquarium in a clean condition and to improve the health of the fish, the aquarium is provided with a circulating pump and a filter. Most frequently, the filter consists of a bed of charcoal granules and a fibrous material such as glass or nylon wool. The fibrous material removes the majority of the solids which are circulated and the charcoal entraps additional solids. The charcoal further retains some of the dissolved material and traps gasses which are dissolved in the water W. The filter, in the prior art, is frequently disposed within the container with tubing connecting the filter to a pump which circulates the water in the aquarium into the filter. Alternately, in the prior art, the filter is disposed in a container attached to, or adjacent to the aquarium, and the water is circulated between the filter and the aquarium by the pump.

In the present invention, a container 12 is mounted in juxtaposition to the aquarium 10 such that the water W in the aquarium 10 is in fluid communication with the container 12 and water W is contained in the container 12. A pump 14 circulates the water W between the aquarium 10 and the container 12. It is preferred that the container 12 is mounted at the top of the aquarium 10 so that water W overflows from the container 12 into the aquarium 10. However, it is not necessary for the container 12 to be disposed for overflow of the water W. It is necessary for water W to be exchanged between the container 12 and the aquarium so that unfiltered water can be introduced into the container 12, pass through a filter 16 and return to the aquarium as cleaned, filtered water W.

The filter 16 is a porous cartridge 18 with a filtration means 20 within the cartridge 18. The filtration means 20 is granular charcoal, filter plate, gravel, baked clay chips, glass beads, etc. The most efficient filtration means 20 is charcoal, and in particular granules of activated charcoal. Charcoal plate or other configuration of charcoal are also acceptable. The porous cartridge 18 may be a fibrous material through which the water W passes without restraint or a thin walled material having a plurality of openings therein through which the water W passes. The cartridge 18 must be able to retain the filtration means 20 inside the cartridge 18.

The top of the cartridge 18 is connected to the bottom of a pot 22. The pot 22 contains soil 24 in which is growing a terrestrial plant 26. The size and shape of the pot 22 is not critical, the only restriction being that the bottom of the pot 22 have an opening 28 which is in communication with the top of the cartridge 18 of the filter 16 and that the pot 22 be supported above the container 12.

Figure 5:
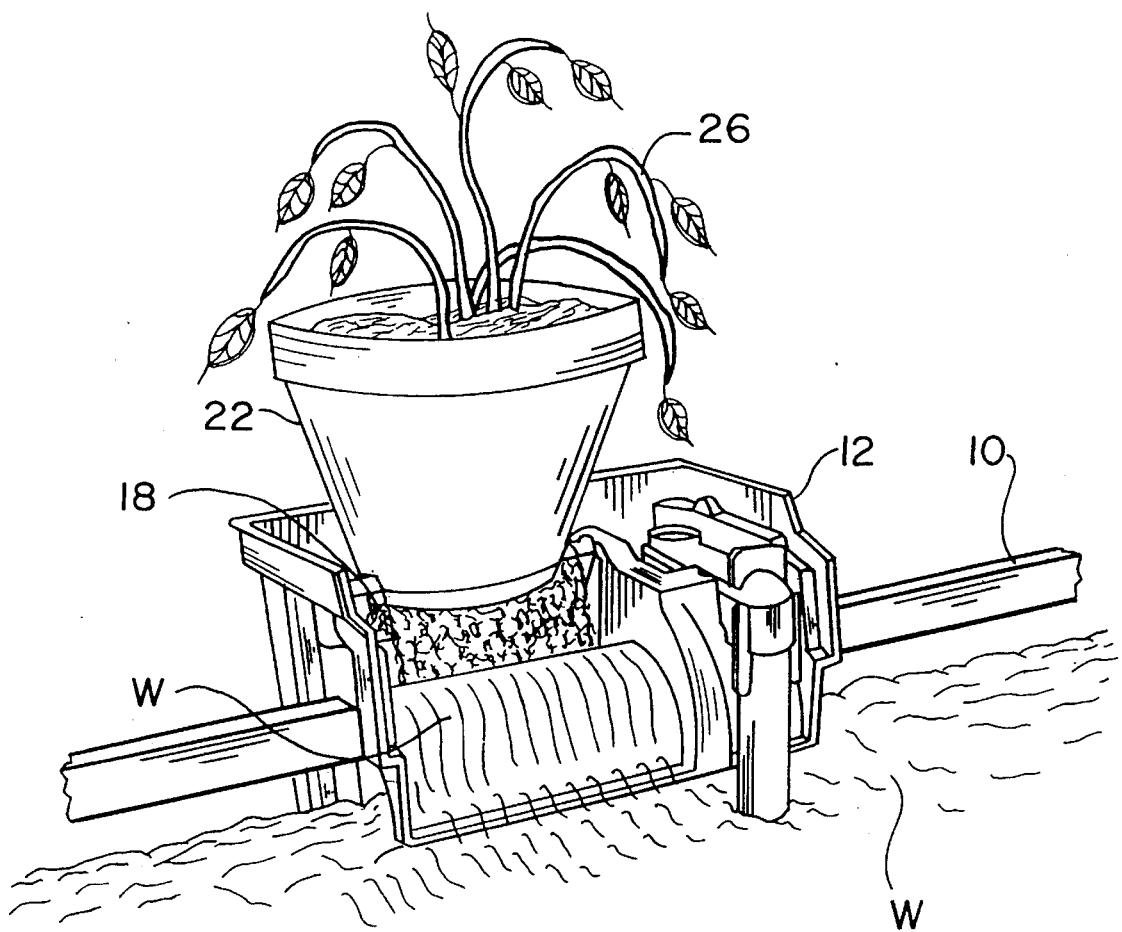
FIG. 5 is a perspective view showing the container mounted in juxtaposition with the aquarium and the potted plant above the container with water flowing from the container into the aquarium.
Figure 6:
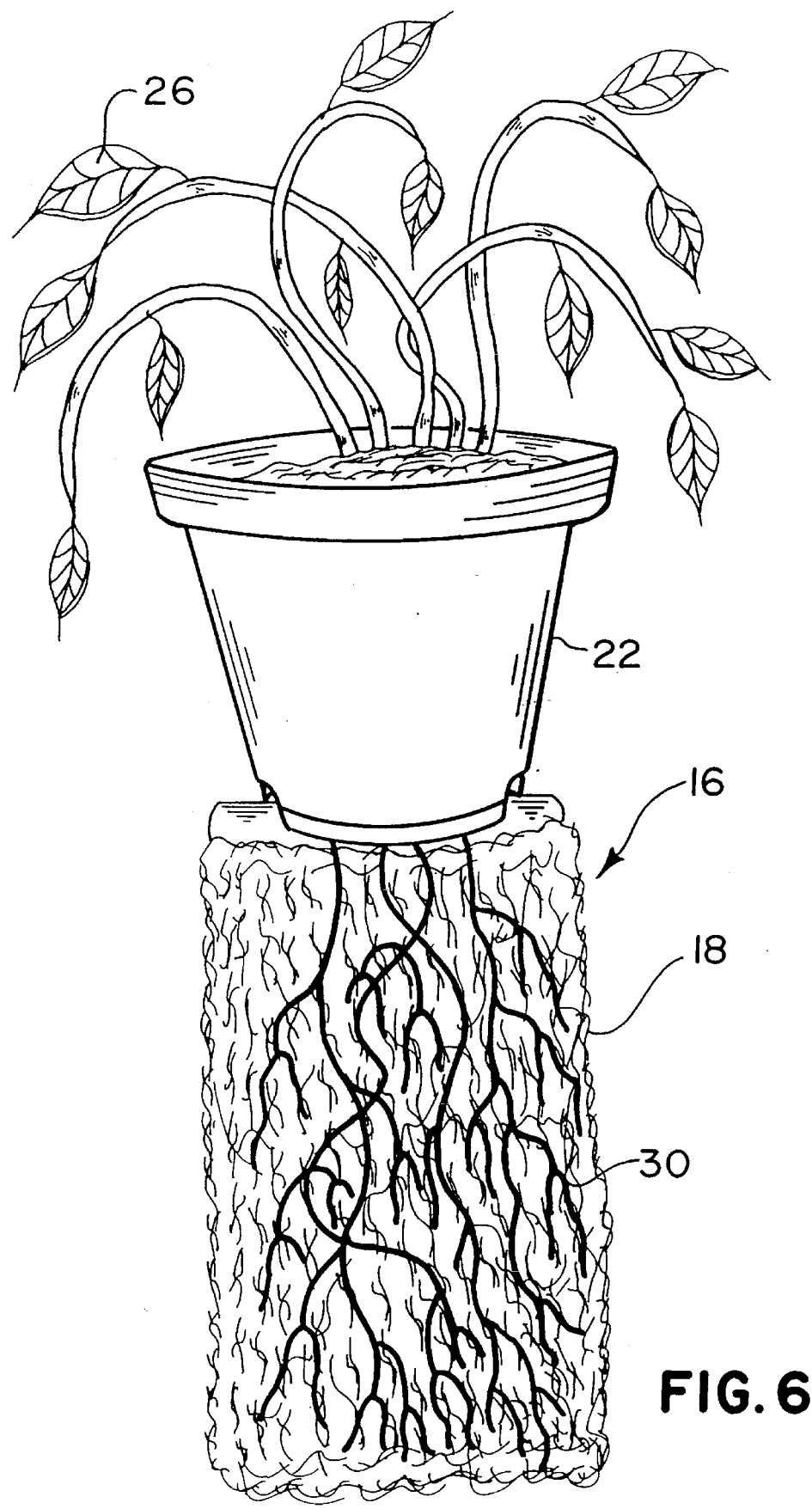
FIG. 6 is a perspective view showing roots of the plant growing in the cartridge containing the filtration means.

The roots 30 of the plant 26 grow through the soil 24 and out of the opening 28 into the cartridge 18 (FIG. 5). As the water W from the aquarium 10 is circulated from the aquarium 10 into the container 12, the water W passes through the porous cartridge 18 (as shown by the arrows A in FIGS. 3 and 4). The solid material such as waste from the fish F, excess fish food and algae are collected on the fibrous material of the cartridge 18 and in the filtration means 20 within the cartridge 18. The roots 30 of the plant 26 utilize the solid material and the dissolved nitrogenous material in the water W. In this manner, the plant 26 which is external of the aquarium 10, continuously removes the pollutants from the water W and the pollutants are not returned to the aquarium 10. The filtration means 20, especially charcoal, trap gasses that promote aerobic biological activity and support growth of the roots 30 of the plant 26. The plant 26 develops a growing extensive root 30 system with a very large increasing surface area to remove greater amounts of pollutants from the water W. As a result, growth of algae in the aquarium is significantly reduced and the concentration of dissolved nitrogenous materials is controlled. Thus, the fish F are not harmed by a build up of dissolved nitrogenous material and are not competing with the algae for oxygen. This promotes healthy fish F which thrive in a clean aquarium 10.

In addition, the appearance of the aquarium 10 is enhanced by the presence of a growing terrestrial plant 26 next to the aquarium 10. The plant 26 is continuously supplied with water W. The water W is heated to the temperature of the aquarium 10 and root 30 growth is stimulated. The type of plant 26 is not critical and, flowering plants of various varieties may be used to enhance the appearance of the setting.

The above described system and method of filtering the water W of an aquarium 10 is not limited to an aquarium but may be applied to larger bodies of water such as a pond or a fish farm, so long as an adequate filter (or filters) is provided with filtration means to remove the pollutants and there are sufficient plants to utilize the pollutants which are removed from the water.

Obviously, many modifications may be made without departing from the basic spirit of the present invention.

Accordingly, it will be appreciated by those skilled in the art that within the scope of the appended claims, the invention may be practiced other than has been specifically described herein.

I claim:

1. A filtration system for an aquarium having water and fish therein, the filtration system comprising:

a container mounted in juxtaposition the aquarium, the container being in fluid communication with the aquarium, a pot having soil and a plant having roots growing therein disposed above the container, a porous cartridge having a top and having filtration means disposed therein, the porous cartridge being disposed within the container, opening means in the pot communicating with the cartridge wherein the roots of the plant grow through the opening means into the cartridge and utilize nutrients carried by the water, thereby maintaining the aquarium in a substantially waste-free condition.

2. The filtration system of claim 1, wherein the filtration means trap gasses which are present in the water, the trapped gasses promoting aerobic biological activity of the roots of the plant such that an extensive fibrous root system develops to utilize greater amounts of waste products.

3. The filtration system of claim 1, wherein the porous cartridge is formed of a fibrous material which retains the filtration means therein and facilitates passage of water therethrough.

4. The filtration system of claim 1, wherein the filtration means is charcoal.

5. The filtration system of claim 1, wherein the nutrients carried by the water are waste and by products from the fish, excess fish food and algae.

6. The filtration system of claim 1, further comprising a means to circulate the water between the aquarium and the container.

7. The filtration system of claim 1, wherein the plant is a terrestrial plant.

8. The filtration system of claim 1, further comprising the pot having a bottom with the opening means therein, the top of the cartridge being connected to the bottom of the pot wherein the roots of the plant grow through the opening means in the bottom of the pot and into the cartridge through the top thereof.

9. A filtration system for an aquarium, the aquarium having water and fish therein and a pump means to recirculate the water, the system further comprising:

a container having an open top mounted in juxtaposition to the aquarium, the pump means being in fluid communication with the container wherein the water is circulated between the container and the aquarium, filtration means contained in a porous cartridge, the cartridge having a top, the cartridge being disposed in the container such that circulating water carrying waste products from the aquarium passes through the porous cartridge, a pot having a bottom with an opening therein mounted in the open top of the container, the opening in the bottom of the container being in communication with the top of the porous cartridge, the pot further containing soil and a plant having roots growing therein whereby the roots of the plant grow into the cartridge and utilize the waste products carried by the water recirculated from the aquarium, such that the aquarium is maintained in a clean and substantially algae-free condition and the plant grows in the pot.

10. A method of filtering water in an aquarium having water and fish therein comprising the steps of:

providing a container in juxtaposition with the aquarium and a pump means to circulate the water between the aquarium and the container, providing a pot having soil therein and a plant with roots growing in the soil, the pot having a bottom having an opening therein, providing a porous cartridge having filtration means therein, the porous cartridge being connected to the bottom of the pot thereby permitting the roots of the plant to grow into the porous cartridge.

circulating the water from the aquarium carrying waste from the fish, uneaten fish food and algae into the porous cartridge in which the plant roots are growing, such that the roots of the plant utilize the waste carried by the water, the plants grow and the aquarium is maintained clean and substantially free of algae.

* * * * *